US008402520B1

(12) United States Patent
Painter et al.

(10) Patent No.: US 8,402,520 B1
(45) Date of Patent: *Mar. 19, 2013

(54) AUTHENTICATION PROTOCOL FOR NETWORK SECURITY SERVICES

(75) Inventors: Mark W. Painter, Fremont, CA (US); Shuosen Robert Liu, San Jose, CA (US); Jianda Li, San Jose, CA (US); Kong Yew Chan, San Mateo, CA (US)

(73) Assignee: Trend Micro Incorporated, Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 13/078,381

(22) Filed: Apr. 1, 2011

Related U.S. Application Data

(63) Continuation of application No. 11/592,000, filed on Nov. 1, 2006, now Pat. No. 7,941,830.

(51) Int. Cl.
*G06F 7/04* (2006.01)
*G06F 15/16* (2006.01)
*G06F 17/30* (2006.01)
*H04L 29/06* (2006.01)
*G06F 9/00* (2006.01)
*G06F 17/00* (2006.01)

(52) U.S. Cl. ............. 726/5; 726/2; 726/3; 726/11

(58) Field of Classification Search ............. 726/2, 3, 726/5, 11, 12, 14, 16, 17, 21
See application file for complete search history.

(56) References Cited

U.S. PATENT DOCUMENTS

| | | | |
|---|---|---|---|
| 5,623,600 A | 4/1997 | Ji et al. | |
| 6,052,785 A * | 4/2000 | Lin et al. | 726/5 |
| 6,195,587 B1 | 2/2001 | Hruska et al. | |
| 6,938,097 B1 | 8/2005 | Vincent et al. | |
| 7,010,807 B1 | 3/2006 | Yanovsky | |
| 7,457,849 B2 * | 11/2008 | Hawkins et al. | 709/217 |
| 7,493,487 B2 * | 2/2009 | Phillips et al. | 713/168 |
| 7,545,748 B1 | 6/2009 | Riddle | |
| 7,565,536 B2 * | 7/2009 | Vassilev et al. | 713/168 |
| 7,941,830 B1 | 5/2011 | Painter et al. | |
| 2002/0052968 A1 | 5/2002 | Bonefas et al. | |
| 2004/0015725 A1 | 1/2004 | Boneh | |
| 2004/0078604 A1 | 4/2004 | Rice et al. | |
| 2005/0120221 A1 | 6/2005 | Arnold et al. | |
| 2005/0289027 A1 * | 12/2005 | Buarque De Macedo | 705/31 |
| 2007/0162766 A1 | 7/2007 | Watanabe | |

OTHER PUBLICATIONS

What is SSL and what are Certificates?, SSL Certificates HOWTO, 6 sheets [retrieved on Oct. 28, 2006], retrieved from the internet: http://tldp.org/HOWTO/SSL-Certificates-HOWTO/x64.html.

(Continued)

*Primary Examiner* — Edan Orgad
*Assistant Examiner* — Jahangir Kabir
(74) *Attorney, Agent, or Firm* — Okamoto & Benedicto LLP

(57) ABSTRACT

In one embodiment, an authentication protocol used in a network security service is performed over non-secure connection, such as HTTP. A router subscribing to the service may send a service request for information about a URL to a server computer providing the service. The service request may be included in a first data set posted by the router to the server computer. The first data set may be described by an HTML form and include an encrypted device authenticator used by the server computer to validate the router. The first data set may further include a server authentication code. In responding to the service request, the server computer returns the server authentication code to the router along with information about the URL. The response may be in a second data set, such as an XML document sent by the server computer to the router over an HTTP connection.

12 Claims, 3 Drawing Sheets

OTHER PUBLICATIONS

Microsoft TechNet—Unsolicited Commercial E-Mail Prevention and Filtering Performance Analysis, Jan. 1999, pp. 1-14, [retrieved on Nov. 2, 2006], retrieved from the internet: http://www.microsoft.com/technet/archive/mcis/rkspmcpa.mspx?pf=true.

Martin Roesch, "Snort-Lightweight Intrusion Detection for Networks",1999, pp. 229-238 of the 13th LISA Conference Proceeding, [retrieved on Nov. 2, 2006], retrieved from the internet: http://www.usenix.org/events/lisa99/full_papers/roesch/roesch_html/.

John Wack et al., "Guide to Firewall Selection and Policy Recommendations", Oct. 2001, pp. 1-63, NIST Special Publication X-X, National Institute of Standards and Technology, U.S. Department of Commerce.

ProQuest Tech Books: Microsoft Computer Dictionary, Fifth Edition, 4 sheets [retrieved on Mar. 25, 2010], retrieved from the internet: http://proquest.safaribooksonline.com/.

* cited by examiner

AUTHENTICATION PROTOCOL FOR NETWORK SECURITY SERVICES

CROSS-REFERENCE TO RELATED APPLICATION

This application is a continuation of U.S. application Ser. No. 11/592,000, filed on Nov. 1, 2006, which is incorporated herein by reference in its entirety.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND OF THE INVENTION

1. Field of the Invention

The present invention relates generally to computer networks, and more particularly but not exclusively to authentication protocols for network security services.

2. Description of the Background Art

A computer network allows server computers to provide various services to devices connected to the network. For sensitive transactions, a secure connection may be established between a server computer and a device. For example, Secure Sockets Layer (SSL) technology may be employed with the Hyper Text Transfer Protocol (HTTP) to provide a secure connection between two computers using a protocol referred to as "HTTP over SSL" (HTTPS). A problem with HTTPS is that it uses certificates and uses full encryption of transmitted data, resulting in relatively high processing overhead. Thus, although HTTPS is adequate for most sensitive transactions, HTTPS may not be suitable in applications where authentication needs to be performed often and relatively fast, such as in services providing information about network addresses. On the Internet, for example, there are various categories of websites including those that provide inappropriate information, perpetuate fraudulent activities, distribute spywares and other malicious codes, to name a few examples. Information about these websites may be maintained in a database in a server computer, which provides the information as a service to subscribing devices. Communications between the server computer and the subscribing devices have to be relatively secure to prevent unauthorized devices from accessing the service or otherwise compromising the information received by the subscribing devices. However, requiring a fully secured connection, such as an HTTPS connection, between the server computer and the subscribing devices may slow down access to the service.

SUMMARY

In one embodiment, an authentication protocol used in a network security service is performed over non-secure connection, such as HTTP. A router subscribing to the service may send a service request for information about a URL to a server computer providing the service. The service request may be included in a first data set posted by the router to the server computer. The first data set may be an HTTP Post, which may be described using HTML, and include an encrypted device authenticator used by the server computer to validate the router. The first data set may further include a server authentication code. In responding to the service request, the server computer returns the server authentication code to the router along with information about the URL. The response may be in a second data set, such as an XML document sent by the server computer to the router over an HTTP connection.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
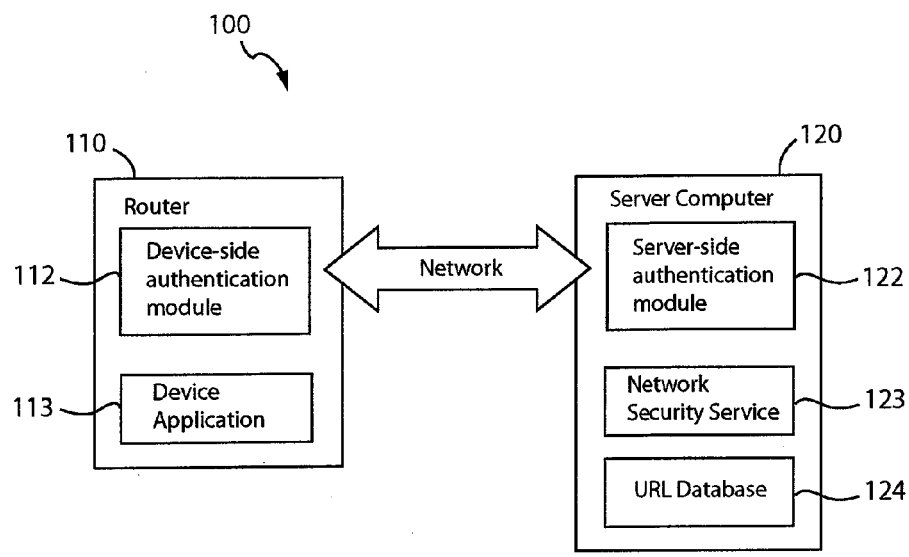
FIG. 1 shows a system for providing network security services in accordance with an embodiment of the present invention.

FIG. 1 shows a system 100 for providing network security services in accordance with an embodiment of the present invention. The system 100 may include a server computer providing a network security service and a device subscribing to the service. In the example of FIG. 1, the device comprises a router 110, while the server computer comprises a server computer 120 for providing information about network addresses. Information about network addresses may be used for network security purposes by, for example, blocking access to certain network addresses. The router 110 and the server computer 120 may communicate over a computer network, such as the Internet. The router 110 is one of many devices subscribing to the service provided by the server computer 120.

In one embodiment, the server computer 120 maintains information about websites accessible over the Internet in a uniform resource locator (URL) database 124. Upon encountering network traffic containing a URL, the router 110 may send a service request to the server computer 120 for information about the URL, such as the category of the website having the URL. The server computer 120 may check the URL against the database 124 to determine the website's category. In one embodiment, the database 124 includes a listing of URLs and the category for each listed URL. The categories may include phishing, adware, pornography, politics, shopping, real estate, and so on. The database 124 may be populated manually by human researchers surfing the Internet and gathering information about websites. Other suitable ways of populating the database 124 may also be used without detracting from the merits of the present invention. In response to the service request, the server computer 120 provides the information about the URL to the router 110. The router 110 may use the information about the URL to decide what to do to packets of the network traffic. For example, the router 110 may be configured to perform a network security function by blocking traffic to and from phishing websites. In that case, the router 110 may block traffic to and from a URL if the server computer 120 indicates that the URL is that of a website belonging to the phishing category.

The router 110 may comprise a device-side authentication module 112 and a device application 113. The authentication module 112 may comprise computer-readable program code for authenticating network communications between the router 110 and the server computer 120. In one embodiment, the authentication module 112 is configured to register to subscribe to a service provided by the server computer 120, to send service request to the server computer 120, and to authenticate communications received from the server computer 120. The device application 113 may comprise an application program that makes use of information received from the server computer 120. For example, the device application 113 may be configured to block or allow packets going to or coming from particular categories of websites or computers that have a particular reputation. The device application 113 may generate a service request for URL information and pass that service request to the authentication module 112 for forwarding to the server computer 120. The authentication module 112 may receive information about the URL from the server computer 120 and pass that information to the device application 113.

The server computer 120 may comprise a server-side authentication module 122, a network security service 123, and the URL database 124. The authentication module 122 may comprise computer-readable program code for authenticating network communications between the server computer 120 and the router 110. In one embodiment, the authentication module 122 is configured to receive subscription service registration from the router 110, to receive service requests from the router 110, and to authenticate communications received from the router 110. The network security service 123 may comprise computer-readable program code for providing network security services to subscribing computers, which in this example include the router 110. In one embodiment, the network security service 123 provides information about network addresses, which in this example comprise URLs. The authentication module 122 may receive service requests for URL information and pass the requests to the network security service 123 for processing. The network security service 123 may consult the database 124 to find information about the URLs and pass the information to the authentication module 122, which then provides the information to the requesting devices.

In one embodiment, the router 110 and the server computer 120 communicate by exchanging data over an HTTP connection. A first data set sent by the router 110 to the server computer 120 may be expressed in the hypertext markup language (HTML), for example. HTML is preferred because it is relatively compact and easy to read and can be transformed into an HTML POST request via commonly understood mechanisms such as a web browser. In response to the router 110, the server computer 120 may send a second data set to the router 110. The second data set may comprise an XML document, for example.

Figure 2:
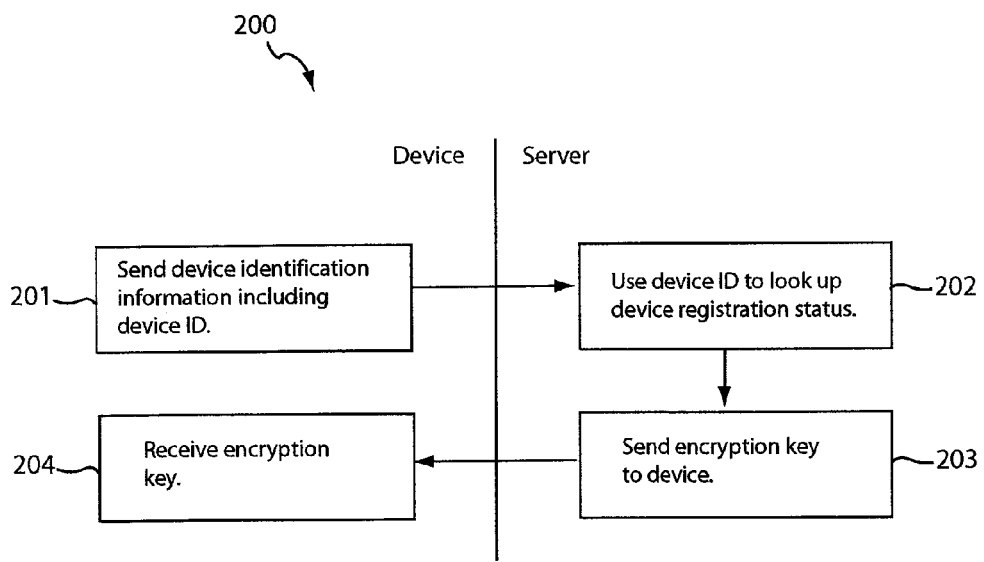
FIG. 2 shows a flow diagram of a method of registering a device to subscribe to a network security service in accordance with an embodiment of the present invention.

Referring now to FIG. 2, there is shown a flow diagram of a method 200 of registering a device to subscribe to a network security service in accordance with an embodiment of the present invention. Steps 201 and 204 may be performed by the subscribing device (e.g., the router 110), while steps 202 and 203 may be performed by the server computer providing the network security service (e.g., the server computer 120). In the example of FIG. 2, the steps 201 and 204 are performed by the authentication module 112 in the router 110, and the steps 202 and 203 are performed by the authentication module 122 in the server computer 120.

In one embodiment, the method 200 is performed over a fully secure connection. In one embodiment, steps 201-204 are performed over an HTTPS connection. As will be more apparent below, a fully secure connection is not required once the router 110 has registered with the server computer 120. There is little or no performance impact in using a fully secure connection during the registration process because registration is typically performed only infrequently.

A purchasing process precedes the registration process. In the purchasing process, the operator of the router 110 ("customer") purchases a subscription to the network security service provided by the server computer 120. As part of the purchase, the customer provides the operator of the server computer 120 ("vendor") a device identifier for each device to be included in the subscription. In return, the service provider provides an encryption key for each of the devices. The purchasing process may occur in the background and may be done over emails, online purchase transaction, in person, etc.

A device identifier may be a code or combination of codes that identify a particular device, such as a serial number, IP address, MAC number, globally unique ID, or other identifier. The encryption key provided by the server computer 120 may be that for a conventional encryption/decryption algorithm, such as the Data Encryption Standard (DES).

To register to subscribe to the service, the router 110 sends device identification information to the server computer 120 (step 201), the device identification including the device identifier of the router 110. In one embodiment, this step is performed by the router 110 by posting an HTTP POST request to the server computer 120. An example HTTP POST request for this step is shown in table 1, using HTML to describe the POST request.

TABLE 1

<form method="POST" action="/ndsp/Register_Device">
  <input type="hidden" name="UDI" value="UDI">
</form>

As shown in the example of Table 1, the device identification information may include the router 110's device identifier ("UDI" string in table 1), as well as additional information.

The server computer 120 receives the device identification information to check the registration status of the router 110 (step 202). For example, the server computer 120 may look up the device identifier in a listing of devices authorized to register for subscription to the network security service. The server computer 120 may send an encryption key to the router 110 (step 203) if the router 110 is authorized to register with the service. The server computer 120 may send the encryption key in an extensible markup language (XML) document. An example XML document for sending the encryption key to the router 110 is shown in table 2.

TABLE 2

```
<?xml version="1.0" encoding="ISO8859-1" ?>
    <ndsp-response>
        <registered/>
        <des-key>DES_KEY</des-key>
    </ndsp-response>
```

In the example of table 2, the "DES_KEY" string includes the encryption key.

The server computer 120 may send an error message to the router 110 if the router 110 is not authorized to register with the service or if there is an error in the registration process. The error message may be in an XML document as shown in the example of table 3.

TABLE 3

```
<?xml version="1.0" encoding="ISO8859-1" ?>
    <ndsp-response>
        <error>Error_Cause</error> // may be more than one instance
    </ndsp-response>
```

In the example of table 3, the "Error_Cause" string may comprise the error message. The error message may indicate that the registration request is missing information, the device is not subscribed to the service, or other errors.

If the router 110 is authorized to register with the service and provided all needed information, the router 110 receives the encryption key (step 204) and uses it in subsequent communications with the server computer 120.

Figure 3A:
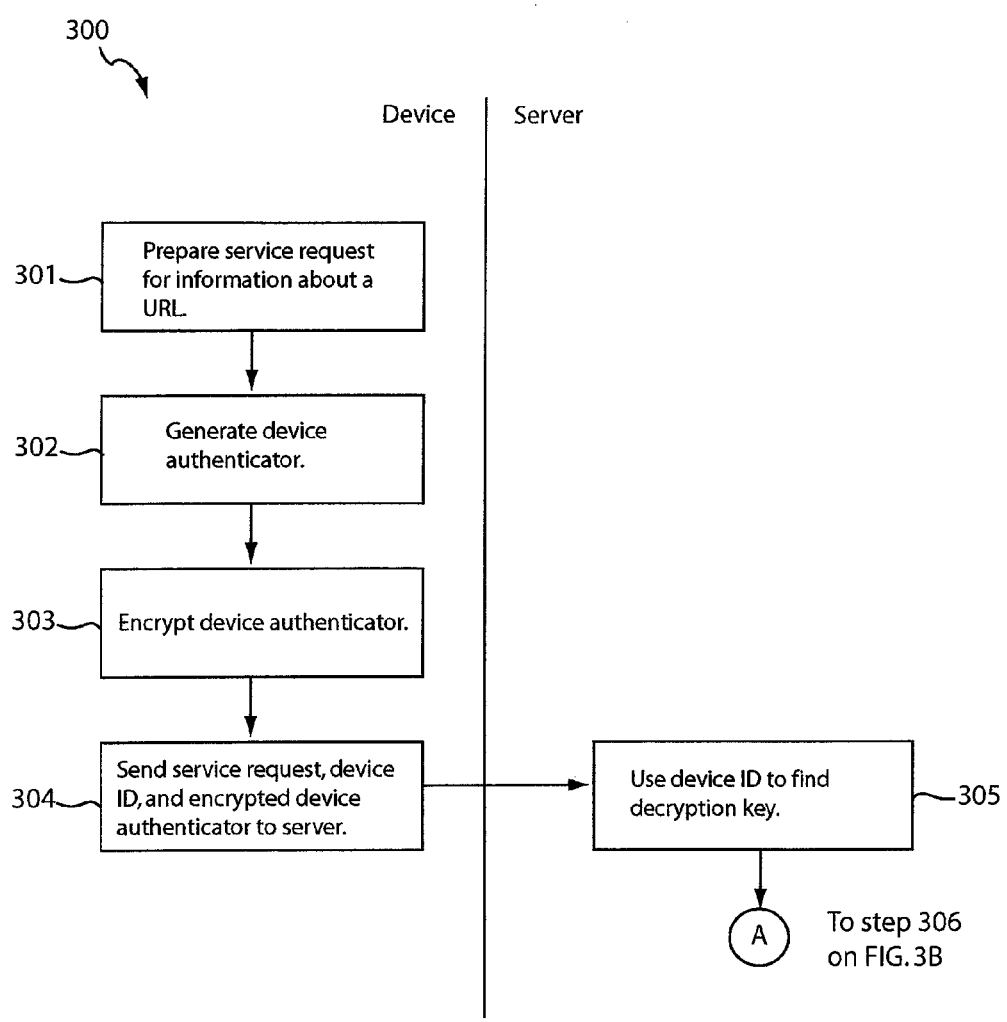
FIG. 3, which consists of FIG. 3A and FIG. 3B, shows a flow diagram of a method of authenticating communications in a network security service in accordance with an embodiment of the present invention.
Figure 3B:
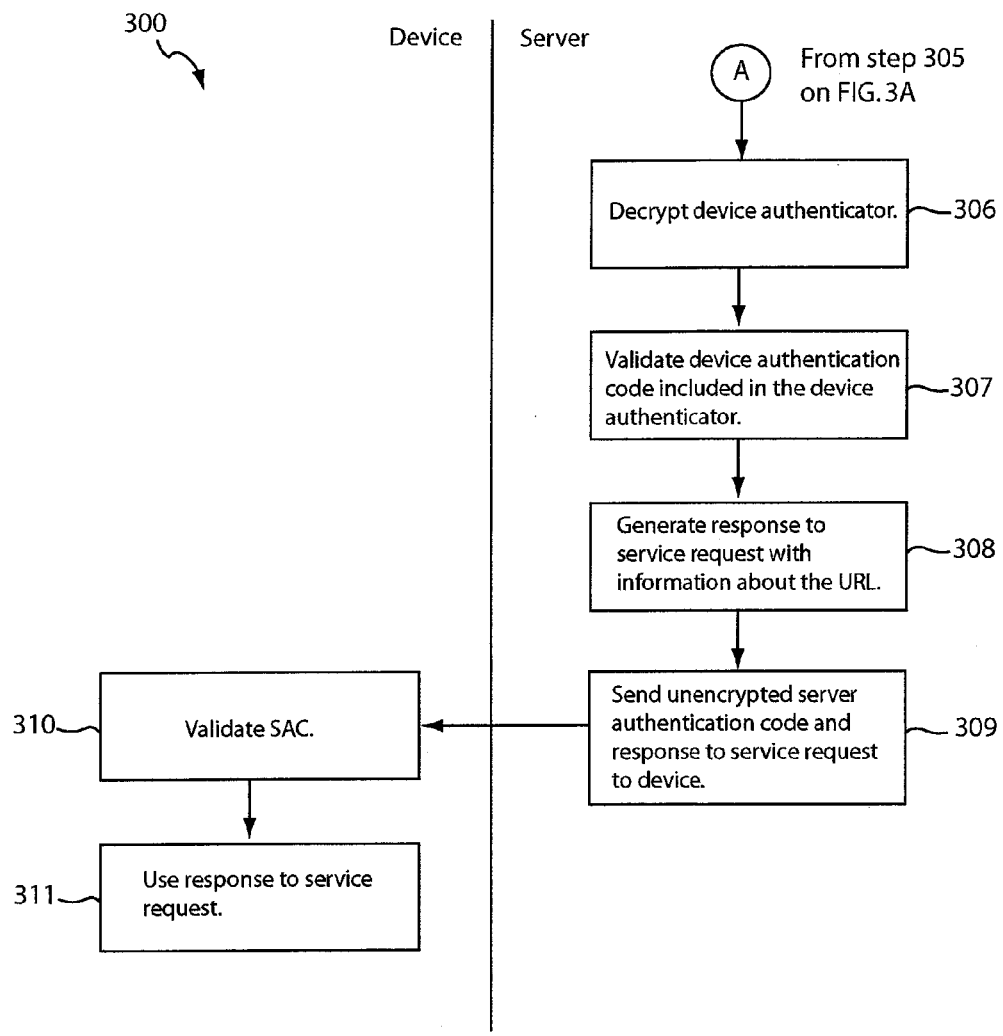

FIG. 3, which consists of FIG. 3A and FIG. 3B, shows a flow diagram of a method 300 for authenticating communications in a network security service in accordance with an embodiment of the present invention. Steps 301-304, 310, and 311 may be performed by the subscribing device (e.g., the router 110), while steps 305-309 may be performed by the server computer providing the network security service (e.g., the server computer 120). For example, in the router 110, the steps 301 and 311 may be performed by the device application 113 and the steps 302-304 and 310 may be performed by the authentication module 112. In the server computer 120, the steps 305-307 and 309 may be performed by the authentication module 122 and the step 308 may be performed by the network security service 123.

In one embodiment, the method 300 is performed over a non-secure connection, such as an HTTP connection, for reduced processing overhead. In the following example, the method 300 is performed by exchanging data over an HTTP connection.

To determine a category of a website having a URL indicated in a network traffic, the router 110 prepares a service request for information about the URL (step 301). The router 110 also prepares a device authenticator (step 302), which may comprise a device authentication code and a server authentication code.

The device authentication code may comprise a code or combination of codes that the server computer 120 may use to verify that the service request is from an authorized device. In one embodiment, the device authentication code comprises the device's device identifier concatenated with an agreed up (e.g., during the purchasing process) or predetermined concatenation value. The concatenation value may be the device's serial number, IP address, or other value. Generally speaking, the device authentication code is an implicitly or explicitly agreed secret code known to the router 110 and verifiable by the server computer 120. The server authentication code may comprise a code or combination of codes for verifying that a response to the service request is from the server computer 120. The router 110 may randomly generate the server authentication code, for example. For increased security, the router 110 may generate a different server authentication code for each service request sent to the server computer 120. Using the encryption key received from the server computer 120 during registration, the router 110 encrypts the server authentication code and the device authentication code.

The router 110 encrypts the device authenticator (step 303) using the key provided to the router 110 during the registration process (e.g., see steps 203 and 204 of FIG. 2). The router 110 then sends the service request for URL information, its device identifier, and the encrypted device authenticator to the server computer 120 (step 304). Note that the device identifier and the service request are sent in the clear (i.e., unencrypted) in this embodiment.

The service request, device identifier, and device authenticator may be sent by the router 110 to the server computer 120 as an HTTP POST request. An example data that may be posted to the server computer 120 for this purpose is shown in table 4, using HTML to describe the content of the HTTP POST.

TABLE 4

```
<form method="POST" action="/ndsp/Classify_URL">
    <input type="hidden" name="requested_URL"
        maxlength="8192" value="URL" >
    <input type="hidden" name="UDI" value="UDI">
    <input type="hidden" name="DEVICE_AUTHTICATOR"
        value="DEVICE_AUTHTICATOR">
</form>
```

In the example of table 4, the "URL" string comprises the URL for which information is requested, the "UDI" string comprises the device identifier of the router 110, and the "DEVICE_AUTHENTICATOR" string comprises the encrypted device authenticator. Only the "DEVICE_AUTHENTICATOR" string is encrypted in the example of HTML form of table 4.

The server computer 120 may use the device identifier to find the correct decryption key for the device authenticator (step 305). For example, the server computer 120 may have a listing of encryption keys given to particular devices, each of which is identified by their corresponding device identifiers.

The server computer 120 may use the decryption key to decrypt the device authenticator (step 306) and extract the device and server authentication codes. Note that there is some performance overhead in decrypting the device authentication code. To further increase performance with minimal impact on security, the router 110 may vary the content of the device authenticator from time to time, but not every time a service request is sent. For example, the router 110 may generate a new server authentication code for every few service requests and not for each service request. In those cases, the device authenticator will be identical for several service requests, and the server computer 120 only has to decrypt the first of identical device authenticators (e.g., by caching the first device authenticator prior to decryption).

The server computer 120 may validate the device authentication code to verify if the router 110 is subscribed to the service (step 307). For example, the server computer 120 may parse the device authentication code to look for the device identifier of the router 110 and the agreed upon or predetermined concatenation value.

If the device authentication code is valid, the server computer 120 generates a response to the service request (step 308) by looking up information about the URL, such as by consulting the database 124. The server computer 120 may then send the response and the unencrypted server authentication code to the device (step 309). Note that the response and the server authentication code are sent in the clear in this embodiment. The server computer 120 may send the response in an XML document. An example XML document for responding to the service request in the case where the device authentication code is valid is shown in table 5.

TABLE 5

```
<?xml version="1.0" encoding="ISO8859-1" ?>
    <ndsp-response>
        <server-authentication>SERVER_AUTHENTICATION</server-
        authentication>
        <requested-URL>URL</requested-URL>
        <category>Category</category> // may be more than one instance
</ndsp-response>
```

In the example of table 5, the "SERVER_AUTHENTICATION" string comprises the server authentication code received from the router 110, the "URL" string identifies the URL for which information is requested, and the "Category" string indicates the category of the website having the URL. In the example of table 5, the entire XML document is sent in the clear.

The server computer 120 may send an error message to the router 110 if the device authentication code is invalid. The error message may be in an XML document as shown in the example of table 6.

TABLE 6

```
<?xml version="1.0" encoding="ISO8859-1" ?>
    <ndsp-response>
        <requested-URL>URL</requested-URL>
        <error>Error_Cause</error> // may be more than one instance
</ndsp-response>
```

In the example of table 6, the "URL" string identifies the URL for which information is requested and the "Error_Cause" string may comprise the error message. The error message may indicate missing information in the service request, the device is not registered or subscribed to the service, an out of date subscription, a service failure, or other errors.

The router 110 validates the server authentication code (step 310) to verify that the response to the service request is actually from the server computer 120. For example, the router 110 may compare the server authentication code received from the server computer 120 to that originally sent by the router 120 for the service request for URL information. Note that the URL for which information is requested may be included in the response, as in table 6, to allow the router 110 to match the server authentication code with the URL.

An authentication protocol for network security services has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for authenticating communications in a network security service, the system comprising:

a subscribing device configured to send a server authentication code as part of a first data set to a server computer, to receive a second data set from the server computer, and to validate the second data set by comparing the server authentication code originally sent by the subscribing device to the server computer against the server authentication code received by the subscribing device from the server computer;

the server computer configured to receive the first data set from the subscribing device over an HTTP connection, the first data set including a service request for information about a network address and an encrypted device authenticator that the server computer decrypts to access a device authentication code for verifying if the device is authorized to send service requests to the server computer, the first data set further including the server authentication code sent by the subscribing device and that the server computer includes in the second data set sent by the server computer to the device over an HTTP connection in response to the service request, the server authentication code being configured to allow the subscribing device to verify that the second data set is from the server computer, the second data set containing information about the network address;

wherein the network address comprises a URL and the information about the network address comprises a category of a website having the URL; and wherein the encrypted device authenticator included in a HTML form is encrypted using an encryption key provided during registration of the subscribing device to subscribe to the network security service.

2. The system of claim 1 wherein the first data set comprises a posting of an HTML form and the second data set comprises an XML document.

3. The system of claim 1 wherein the server computer receives the first data set and sends the second data set over the Internet.

4. The system of claim 1 wherein the subscribing device comprises a router configured to post the first data set to the server computer and to receive the second data set as an XML document from the server computer.

5. A method of authenticating communications in a network security service, the method to be performed by a server computer providing the network security service to a subscribing device, the method comprising:

the subscribing device sending a first data set to the server computer;

the first data set comprising a service request for information about a network address, an encrypted device authenticator, and a server authentication code;

the server computer receiving the first data set over an HTTP connection, decrypting a portion of the first data set to extract a device authentication code identifying the subscribing device as an originator of the service request, and authorized to send service requests to the network security service;

the server computer sending a second data set over an HTTP connection, the second data set comprising the information about the network address and the server authentication code received by the server computer from the subscribing device as part of the first data set, the subscribing device receiving the second data set and validating the second data set by comparing the server authentication code in the second data set against the server authentication code originally sent by the subscribing device to the server computer as part of the first data set;

wherein the network address comprises a URL and the information about the network address comprises a category of a website having the URL; and wherein the encrypted device authenticator included in a HTML form is encrypted using an encryption key provided during registration of the subscribing device to subscribe to the network security service.

6. The method of claim 5 wherein the first data set is posted to the server by the subscribing device.

7. The method of claim 6 wherein the second data set comprises an XML document.

8. The method of claim 5 wherein the entirety of the second data set is not encrypted.

9. The method of claim 5 wherein only the device authentication code is encrypted in the first data set.

10. The method of claim 5 wherein the subscribing device comprises a router.

11. The method of claim 5 wherein the device authentication code comprises an identifier of the subscribing device concatenated with a predetermined concatenation value.

12. The method claim 5 wherein the subscribing device and the server computer communicate over the Internet.

* * * * *